United States Patent

Chen et al.

[11] Patent Number: 5,987,391
[45] Date of Patent: Nov. 16, 1999

[54] METHOD FOR PREDICTING AND IMPROVING WEAR CHARACTERISTICS OF LASER TEXTURED BUMPS FORMED ON MAGNETIC RECORDING DISK

[75] Inventors: Chris C. Chen, Taipei; Jason S. Lin, Luo-Tung Chen; Jamin Suen, Hsin-chu, all of Taiwan

[73] Assignee: Trace Storage Tech. Corp., Hsinchu, Taiwan

[21] Appl. No.: 08/909,698

[22] Filed: Aug. 12, 1997

[51] Int. Cl.[6] .............................. G01B 5/18; G01B 5/30; G06F 19/00
[52] U.S. Cl. ............................ 702/34; 702/33; 360/130
[58] Field of Search .................... 702/33–36, 158, 702/164, 166; 73/7; 364/128; 360/130

[56] References Cited

U.S. PATENT DOCUMENTS

| | | | |
|---|---|---|---|
| 5,761,003 | 6/1998 | Sato | 360/103 |
| 5,902,665 | 5/1999 | Kuroda et al. | 360/135 |

*Primary Examiner*—Kamini Shah
*Attorney, Agent, or Firm*—W. Wayne Liauh

[57] ABSTRACT

A method for predicting total bump height reduction from volume wear rate data for a laser textured magnetic disk. In this method, a bump topography function, r(h), is first established by which the bump half-width, r, is expressed as a function of bump depth, h. Then the bump height depth after first revolution, $h_1$, is calculated according to the following equation:

$$4\pi r_m n \int_0^{h_1} r(h)\,dh = W_{Total\ Wear\ Volume}$$

Based on the observation of constant wear volume per cycle, the bump height depth after each subsequent revolution, $h_i$, $i=2\ldots N$, is calculated according to the following equation:

$$\int_0^{h_1} r(h)\,dh = \int_{h_1}^{h_2} r(h)\,dh = \ldots = \int_{h_{N-1}}^{h_N} r(h)\,dh$$

The so-calculated $h_N$ is the total bump height reduction after the Nth revolution.

11 Claims, 1 Drawing Sheet

METHOD FOR PREDICTING AND IMPROVING WEAR CHARACTERISTICS OF LASER TEXTURED BUMPS FORMED ON MAGNETIC RECORDING DISK

FIELD OF THE INVENTION

The present invention relates to a method for quantitatively interpreting volume wear rate of laser textured bumps on magnetic recording disks so as to allow more accurate predictions of the service life of these disks. More specifically, the present invention relates to a method for quantitatively characterizing total bump height reduction as a function of total revolutions based on measured volume wear rate data. The method disclosed in the present invention can be most advantageously utilized for designing optimum bump topography of laser textured bumps, so as to maximize the service life of magnetic recording disks.

BACKGROUND OF THE INVENTION

Computer hard disks typically contain a protective, or overcoat, layer, above the magnetic layer. The overcoat layer is made of a highly wear-resistance material and is subject to direct wear resulting from frictional contact with the magnetic head so as to sacrificially protect the magnetic layer.

Recently, laser texturing techniques have been developed and utilized for high-performance, particularly low-flying-height, magnetic disks to form laser zone textures including the overcoat layer. Disks with laser zone texture often can offer the advantages of relatively low manufacturing costs as well as high precision control of disk surface topography and zone position.

Most of the published works on laser zone texture techniques have focused on optimizing the laser pulse width, spot size, pulse energy, and the effects the changes of these parameters on the formation of various bump shapes and bump heights. While these studies have provided very useful information regarding tribological performance in CSS testing and glide avalanche predictions and experiments, no study has been reported in the prior art which would deal with providing a tool for a quantitative description of wear characteristics for the laser zone textured bumps. A better understanding of the wear characteristic will aid the design of better laser textured bumps and improve the service of magnetic recording disks.

SUMMARY OF THE INVENTION

The primary object of the present invention is to develop a method for quantitatively describing the wear characteristics for laser zone textured bumps that have been formed on a magnetic recording medium. More specifically, the primary object of the present invention is to develop a technique which can quantitatively convert experimentally measured volume wear data into a set of time-dependent, or more specifically, total-revolution-dependent, overall bump height reduction data. In predicting disk performance, the bump height reduction data, rather than total wear volume, is the more pertinent parameter. The method disclosed in the present invention will greatly aid hard disk manufacturers to design the optimum topography as well as other parameters for laser textured bumps.

In the present invention, the bump height reduction after the first revolution, $h_1$, can be calculated which is related to the total wear volume by the following equation:

$$4\pi r_m n \int_0^{h_1} r(h)\,dh = W_{Total\ Wear\ Volume} \quad (1)$$

wherein h is the bump depth (i.e., distance from the original bump peak, or the total bump height reduction after a predetermined number of revolutions due to wear), $h_1$ is the bump depth after first revolution, r is the half width of the bump at depth h, $r_m$ is the half width at zero bump height (i.e., before wear), n is the number of total revolutions, $W_{total\ Wear\ Volume}$ is the measured total wear volume after n revolutions. Since r is a function of bump depth, it can be expressed as r(h) or alternatively, as $r_h$. Eqn. (1) is obtained based on the observations of constant wear volume per revolution.

Since r(h) often cannot be expressed analytically, Eq (1) must be solved numerically, typically through numerical integration, to obtain $h_1$. Preferably, r(h) is expressed in a tabulated form which lists the half-width at various bump depths. Bump depth is defined as the distance from the original peak of the bump, i.e., before wear.

Once $h_1$ is obtained, based on the observation of constant wear volume per cycle for laser textured bumps, the bump depth after each revolution can be calculated as follows:

$$\int_0^{h_1} r(h)\,dh = \int_{h_1}^{h_2} r(h)\,dh = \ldots = \int_{h_{n-1}}^{h_n} r(h)\,dh \quad (2)$$

Again, since r(h) often is not expressed analytically, Eq (2) must also be solved numerically, typically through numerical integration, to obtain all the h's, after each revolution, respectively.

The total bump height reduction after n revolutions, H, which is the main parameter of interest in determining the wear characteristics of the laser textured bump, can then be calculated according to the following equation:

$$H = h_n \quad (3)$$

Based on the above derivations, the characteristic of the laser zone textured bumps, in terms of total bump height reduction after a predetermined number of revolutions can be predicted using a procedure which includes the following steps:

(1) Expressing the bump half-width, r, as a function of bump depth, h. This expression, which is designated as r(h), can be either analytical or in a tabulated form, or in any other appropriate forms;

(2) Measuring total wear volume, $W_{Total\ Wear\ Volume}$, after a predetermined number of revolutions, n;

(3) Calculating bump height depth after first revolution, $h_1$, either numerically or analytically, according to the following equation:

$$4\pi r_m n \int_0^{h_1} r(h)\,dh = W_{Total\ Wear\ Volume} \quad (1)$$

(4) Calculating the bump height depth after each subsequent revolution, $h_i$, i=2 . . . n, either numerically or analytically, according to the following equation:

$$\int_0^{h_1} r(h)\,dh = \int_{h_1}^{h_2} r(h)\,dh = \ldots = \int_{h_{n-1}}^{h_n} r(h)\,dh \quad (2)$$

Eq. (1) is based on the observation of constant volume rate per cycle of revolution.

(5) wherein $h_n$ is the total bump height reduction after the nth revolution.

In practice, an adjustable parameter can be introduced such that Equation (1) becomes:

$$4\alpha\pi r_m n \int_0^{h_1} r(h)\,dh = W_{Total\ Wear\ Volume} \quad (4)$$

In Equation (4), $\alpha$ is an adjustable parameter, it can be obtained by comparing the total bump height reduction calculated according to the above procedure with the actually measured total bump height reduction. Typically, the adjustable parameter $\alpha$ is obtained based on measurements made from a relatively small number of revolutions, n. Then the same $\alpha$ is used to calculate (i.e., predict) the total bump height reduction that can be expected after a relatively large number of revolutions, N (N>n). The adjustable parameter is use as the observation of constant wear volume per revolution is not exactly true during the initial period.

BRIEF DESCRIPTION OF THE DRAWING

The present invention will be described in detail with reference to the drawing showing the preferred embodiment of the present invention, wherein.

DETAILED DESCRIPTION OF THE PREFERRED EMBODIMENT

Figure 1:
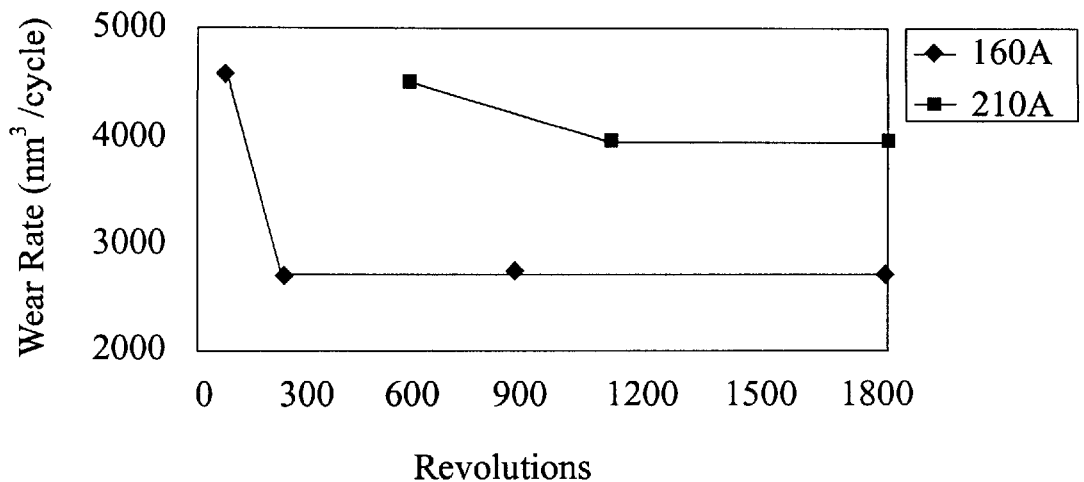
FIG. 1 is a plot of wear volume rate versus number of revolutions; it clearly shows that the volume wear rate was nearly constant except during the initial period of the wear test.

The present invention discloses a novel method for quantitatively describing the wear characteristics for laser zone textured bumps that have been formed on a magnetic recording medium, by developing a technique which can quantitatively convert the experimentally measured volume wear data to overall bump height reduction data. Since it is the bump height reduction rather than the volume wear data which more accurately describes the bump characteristics, the method disclosed in the present invention can be utilized to design the optimum topography for laser textured bumps.

In the present invention, the total bump height reduction after a predetermined number of revolutions can be calculated using the the following steps:

(1) Expressing the bump half-width, r, as a function of bump depth, h, this expression typically is provided in a tabulated form, however, the relationship, r(h), between r and h can also be approximated by an analytical expression;

(2) Measuring the total wear volume, $W_{Total\ Wear\ Volume}$, after a predetermined number of revolutions, n;

(3) Using the following equation to calculate the bump height depth (i.e., the total bump height reduction) after first revolution, $h_1$, either numerically or analytically,:

$$4\pi r_m n \int_0^{h_1} r(h)\,dh = W_{Total\ Wear\ Volume} \quad (1)$$

(4) Using the following equation to calculate the bump height depth after each subsequent revolution, $h_i$, i=2 . . . n, either numerically or analytically:

$$\int_0^{h_1} r(h)\,dh = \int_{h_1}^{h_2} r(h)\,dh = \ldots = \int_{h_{n-1}}^{h_n} r(h)\,dh \quad (2)$$

(5) wherein $h_n$ is the total bump height reduction after the nth revolution.

The above procedure may be modified by introducing an adjustable parameter to Equation (1), which then becomes:

$$4\alpha\pi r_m n \int_0^{h_1} r(h)\,dh = W_{Total\ Wear\ Volume} \quad (4)$$

In Equation (4), $\alpha$ is an adjustable parameter, it is calculated as the ratio between the total bump height reduction calculated according to the above procedure and the actually measured total bump height reduction. In a preferred embodiment, the adjustable parameter $\alpha$ is obtained from a relatively small number of revolutions, n. Then the same $\alpha$ is used to calculate the total bump height reduction to be expected after a relatively large number of revolutions, N (N>n).

In the modified procedure, the total bump height reduction after n revolutions, $h_n$, is calculated using Equations (1) through (3). Then the actual total height reduction $H_n$ is measured, and the adjustable parameter $\alpha$ is calculated as $H_n/h_n$. Then Equations (4), (2) and (3) are then used, in conjunction with the newly calculated $\alpha$, to predict the total height reduction that can be expected after a relatively large number of revolutions, $h_N$. The value of N is typically much greater than n, i.e., N>>n.

For crater-shaped bumps, the bump half-width r can be approximated as an analytic function of the bump depth h as follows:

$$r(h) = \sqrt{2hR_b h - h^2} \quad (5)$$

Wherein:

$$R_h = \frac{r_b^2 + H_b^2}{2H_b} \quad (6)$$

In Eqn (6), $R_b$ is the radius of curvature of the bump, $r_b$ is the half width of the bump at zero bump height, $H_b$ is the total bump height of the crater-shaped bump.

The present invention will now be described more specifically with reference to the following examples. It is to be noted that the following descriptions of examples, including the preferred embodiment of this invention, are presented herein for purposes of illustration and description, and are not intended to be exhaustive or to limit the invention to the precise form disclosed.

EXAMPLE 1

Ni—P/Al substrates were laser textured to form bumps having a nominal bump height of 160 Å, and sputtered in a DC magnetron sputtering system. The bumps contained a protective overcoat layer. The laser texturing device was a Nd—YVO$_4$ solid state laser with a characteristic wave length of 1064 nm, with the aid of a beam expander, objective lens, and other optic train. A spiral bump pattern was formed on the disk zone region, which was attributed to the movement of the linear stage and spindle rotation. The unlubricated disks were subject to constant speed drag test at 1 rpm, 30 rpm, and 100 rpm, respectively, using a 50% slider with a pseudo-contact head. The wear test was stopped after a predetermined number of wear cycles.

The wear depth of the bump profile was measured by AFM. Four measurements were made at different positions along the same track with a special mark technique. The depth of wear was averaged over these measurements. After the measurements, the disks were reinserted into the CSS tester and the test was continued on the same track.

Figure 2:
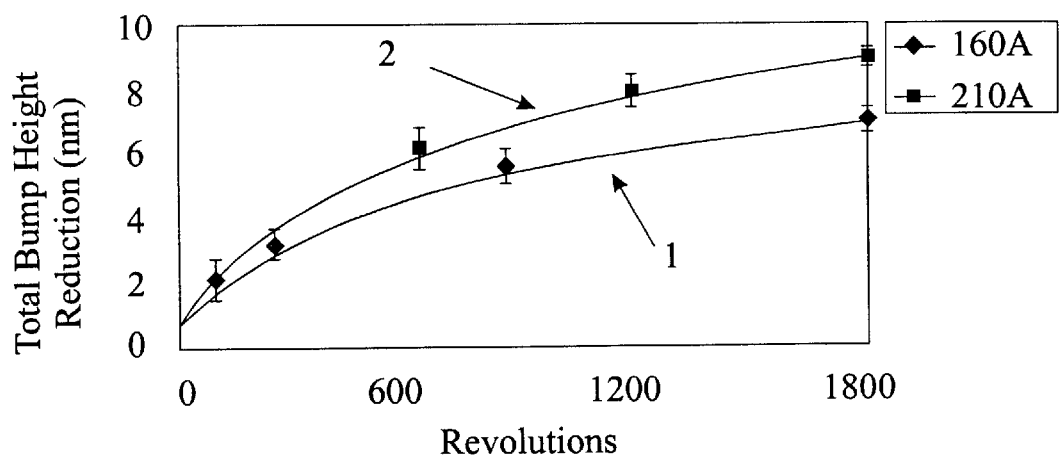
FIG. 2 is a plot of the measured total bump height reduction versus the calculated total bump height reduction without any adjustable parameter (i.e., $\alpha=1$)

FIG. 1 shows the wear volume rate versus number of revolutions; it clearly shows that the volume wear rate was nearly constant except during the initial period of the wear test. This affirms the assumption behind Equation (2) described above. FIG. 2 compares the measured total bump height reduction versus the calculated total bump height reduction without any adjustable parameter (i.e., α=1), after various revolutions. Good agreement was observed between the measured and calculated values.

EXAMPLE 2

Ni—P/Al substrates were laser textured to form bumps having a nominal bump height of 210 Å, and sputtered in a DC magnetron sputtering system. The laser texturing device was a Nd—YVO$_4$ solid state laser with a characteristic wave length of 1064 nm, with the aid of a beam expander, objective lens, and other optic train. A spiral bump pattern was formed on the disk zone region, which was attributed to the movement of the linear stage and spindle rotation. The unlubricated disks were subject to constant speed drag test at 1 rpm, 30 rpm, and 100 rpm, respectively, using a 50% slider with a pseudo-contact head. The wear test was stopped after a predetermined wear cycle.

The wear depth of the bump profile was measured by AFM. Four measurements were made at different positions along the same track with a special mark technique. The depth of wear was averaged over these measurements. After the measurements, the disks were reinserted into the CSS tester and the test was continued on the same track.

FIG. 1 shows the wear volume rate versus number of revolutions; it clearly shows that the volume wear rate was nearly constant except during the initial period of the wear test. This affirms the assumption behind Equation (2) above. FIG. 2 compares the measured total bump height reduction versus the calculated total bump height reduction without any adjustable parameter (i.e., α=1), after various revolutions. Good agreement was observed between the measured and calculated values.

Using Eqs. (5) and (6), the radii of bump heights were calculated for the above two examples, and the calculation results are summarized in Table 1, below.

TABLE 1

| Bump height | radius of curvature |
|---|---|
| 160 Å | 33.3 μm |
| 210 Å | 25.0 μm |

Based on the observation of constant volume wear rate and Eqn (4) derived in the present invention, the disk with a lower bump height (160 Å) will have a lesser bump height reduction than that with a higher bump height (230 Å). This is confirmed by comparing the two curves shown in FIG. 2. In FIG. 2, it is shown that Curve 1, which represents the total bump height reduction for the 160 Å disk, has a lower height reduction than that for the 230 Å disk, which is shown in Curve 2.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for predicting long-term total bump height reduction from short-term volume wear rate data for a laser textured magnetic disk, comprising the steps of:

(1) laser texturing a bump on a magnetic disk, said bump having a bump topography according to a predetermined bump topography function, r(h), by which the bump half-width, r, is expressed as a function of bump depth, h;

(2) subjecting said magnetic disk to a constant speed drag test;

(3) stopping the constant speed drag test after a predetermined number of drag revolutions, n, and measuring total wear volume, $W_{Total\ Wear\ Volume}$;

(4) calculating a bump height reduction after first revolution, $h_1$, according to the following equation:

$$4\pi r_m n \int_0^{h_1} r(h)\,dh = W_{Total\ Wear\ Volume} \qquad (1)$$

where $r_m$ is the half width at zero bump height;

(5) incrementally calculating the bump height reduction after each subsequent revolution, $h_i$, i=2 ... N, where N>n, according to the following equation:

$$\int_0^{h_1} r(h)\,dh = \int_{h_1}^{h_2} r(h)\,dh = \ldots = \int_{h_{N-1}}^{h_N} r(h)\,dh \qquad (2)$$

wherein $h_N$ is the predicted total bump height reduction after said magnetic disk is subject to the constant speed drag test for N revolutions.

2. The method for predicting long-term total bump height reduction from short-term volume wear rate data according to claim 1 wherein said bump topography function, r(h), is expressed in a tabulated form.

3. The method for predicting long-term total bump height reduction from short-term volume wear rate data according to claim 1 wherein said bump topography function, r(h), is expressed in an analytical form.

4. A method for predicting long-term total bump height reduction from short-term volume wear rate data for a laser textured magnetic disk, comprising the steps of:

(1) laser texturing a bump on a magnetic disk, said bump having a bump topography according to a predetermined bump topography function, r(h), by which the bump half-width, r, is expressed as a function of bump depth, h;

(2) subjecting said magnetic disk to a constant speed drag test;

(3) stopping the constant speed drag test after a predetermined number of revolutions, n and measuring total wear volume, $W_{total\ Wear\ Volume}$;

(4) calculating an unadjusted bump height reduction after first revolution, $H_1$, according to the following equation:

$$4\pi r_m n \int_0^{H_1} r(h)dh = W_{Total\ Wear\ Volume} \quad (1')$$

where $r_m$ is the half width at zero bump height;

(4) calculating the unadjusted bump height reduction after each subsequent revolution, $H_i$, i=2 ... n, according to the following equation:

$$\int_0^{H_1} r(h)dh = \int_{H_1}^{H_2} r(h)dh = \ldots = \int_{H_{n-1}}^{H_n} r(h)dh \quad (2')$$

(5) measuring actual total bump height reduction after the nth revolution, $H'_n$;

(6) calculating an adjustable parameter $\alpha$, which is defined as the ratio of $H'_n/H_n$;

(7) calculating adjusted bump height reduction after first revolution, $h_1$, according to the following equation:

$$4\alpha\pi r_m n \int_0^{h_1} r(h)dh = W_{Total\ Wear\ Volume} \quad (1'')$$

(8) calculating adjusted bump height reduction after each subsequent revolution, $h_i$, i=2 ... N, where N>n, according to the following equation:

$$\int_0^{h_1} r(h)dh = \int_{h_1}^{h_2} r(h)dh = \ldots = \int_{h_{N-1}}^{h_N} r(h)dh \quad (2)$$

wherein $h_N$ is the predicted total bump height reduction after said magnetic disk is subject to the constant speed drag test for N revolutions.

5. The method for predicting long-term total bump height reduction from short-term volume wear rate data according to claim 4 wherein said bump topography function, r(h), is expressed in a tabulated form.

6. The method for predicting long-term total bump height reduction from short-term volume wear rate data according to claim 4 wherein said bump topography function, r(h), is expressed in an analytical form.

7. The method for predicting long-term total bump height reduction from short-term volume wear rate data according to claim 4 wherein said adjustable parameter $\alpha$ equals one.

8. The method for predicting long-term total bump height reduction from short-term volume wear rate data according to claim 4 wherein N is substantially greater than n.

9. A method for determining optimal bump topography to achieve a minimum bump height reduction for a laser textured magnetic disk, said method comprising the steps of:

(1) laser texturing a bump pattern on said laser magnetic disk according to a bump topography, r(h), by which the bump half-width, r, is expressed as a function of bump depth, h;

(2) subjecting said laser textured disk to a constant speed drag test;

(3) stopping the constant speed drag test after a predetermined number of drag revolutions, n, and measuring total wear volume, $W_{total\ Wear\ Volume}$;

(4) calculating bump height initial after first revolution, $h_1$, according to the following equation:

$$4\pi r_m n \int_0^{h_1} r(h)dh = W_{Total\ Wear\ Volume} \quad (1)$$

where $r_m$ is the half width at zero bump height;

(5) calculating the bump height depth after each subsequent revolution, $h_i$, i=2 ... N, N>n, according to the following equation:

$$\int_0^{h_1} r(h)dh = \int_{h_1}^{h_2} r(h)dh = \ldots = \int_{h_{n-1}}^{h_n} r(h)dh \quad (2)$$

(6) repeating steps (1) through (5) using a different bump topography function, if necessary, to obtain a a $h_N$ value which satisfies a design criterion.

10. The method for determining optimal bump topography to achieve minimum bump height reduction according to claim 1 wherein said bump topography function, r(h), is expressed in a tabulated form.

11. The method for determining optimal bump topography to achieve minimum bump height reduction according to claim 1 wherein said bump topography function, r(h), is expressed in an analytical form.

* * * * *